United States Patent [19]

Lelandais

[11] 4,310,863

[45] Jan. 12, 1982

[54] MAGNETIC TAPE RECORDERS

[75] Inventor: Guy Lelandais, Bures sur Yvette, France

[73] Assignee: Enertec, Montrouge, France

[21] Appl. No.: 35,972

[22] Filed: May 4, 1979

[51] Int. Cl.³ .............. G11B 15/60; G11B 15/43; G11B 15/26
[52] U.S. Cl. .................... 360/90; 226/189; 242/76; 360/130.21
[58] Field of Search .............. 360/90, 130.2, 130.21, 360/130.3, 130.31, 83, 71; 226/188–192; 242/75, 75.1, 75.2, 76

[56] References Cited

U.S. PATENT DOCUMENTS

| 3,391,399 | 7/1968 | Pendleton | 360/90 |
| 3,438,558 | 4/1969 | Hammond | 360/90 |
| 3,884,430 | 5/1975 | Martin | 242/76 |
| 4,054,929 | 10/1977 | Levy | 360/90 |
| 4,122,504 | 10/1978 | Prozzo et al. | 360/130.21 |

Primary Examiner—Alfred H. Eddleman
Attorney, Agent, or Firm—Joseph J. Kaliko; Mikio Ishimaru; Dale Gaudier

[57] ABSTRACT

In a magnetic-tape recorder, tension rollers positioned before and after the tape heads in the tape path have an outer layer of a polyurethane elastomer to absorb vibration of the tape and reduce flutter. Grooves in the elastomer layer enable the effective resilience of the elastomer to be reduced below the bulk value.

9 Claims, 4 Drawing Figures

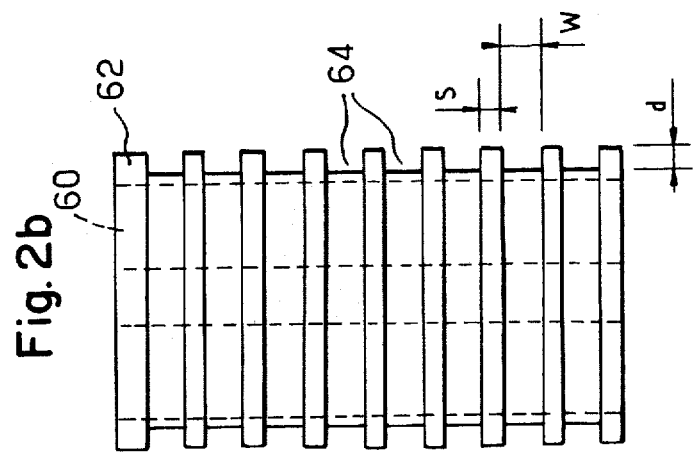
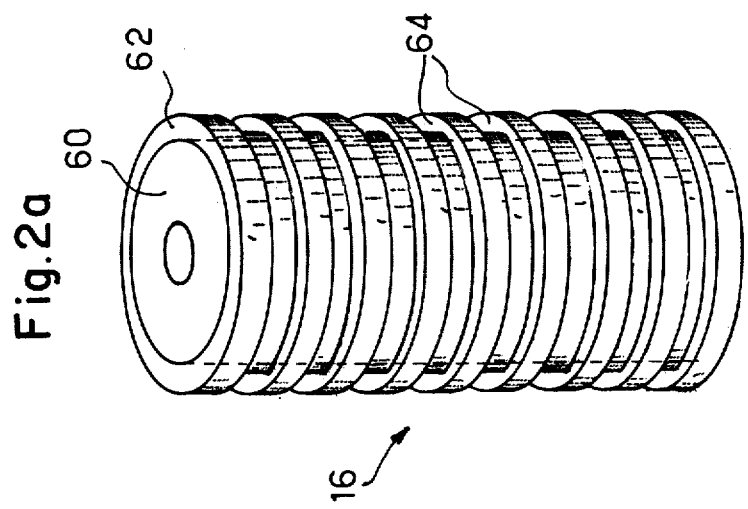

MAGNETIC TAPE RECORDERS

BACKGROUND OF THE INVENTION

This invention relates to magnetic-tape recorders.

A magnetic-tape recorder typically includes a tape transport for moving a magnetic tape past record and replay heads, plus associated circuitry for energising the record head(s) in accordance with a signal or signals to be recorded and for amplifying and processing signals derived by the replay head(s) when the tape is replayed.

The tape transport itself generally comprises: spindles to carry the tape supply and take-up spools; a capstan (sometimes associated with a pinch roller) to engage the tape and move it at a constant speed past the heads; rollers with fixed axes to guide the tape in the desired path from the supply spool via the capstan and heads to the take-up spool; rollers with movable axes to engage the tape and guide and maintain it in tension along the tape path; and motors (for example, servo-motors) to rotate the spindles and capstan at the required speed.

One of the problems encountered with prior art tape recorders is flutter: relatively rapid fluctuations of low amplitude in the speed of movement of the tape past the heads. Flutter causes distortion as between the input signal during recording and the output signal produced upon replay, particularly if the mode of recording involves frequency-modulation of a carrier signal which is recorded on the tape. It is an object of this invention to reduce flutter in magnetic-tape recorders.

SUMMARY OF THE INVENTION

According to this invention there is provided a magnetic-tape recorder including at least one tape head and rollers arranged to guide the tape along a predetermined path extending past the tape head, wherein there are at least two rollers which have resilient surfaces and which are positioned respectively before and after the tape head in the tape path.

Preferably said two rollers are arranged to engage the tape to maintain the tension thereof.

At least one other respective roller may be positioned in the tape path between said tape head and each of said two rollers. However, it is believed to be preferable for the number of such other rollers to be minimised.

Each of said two rollers may comprise a core carrying an outer layer of resilient material, having, for example, a hardness in the range 30 to 100 Shore, and preferably of between 40 and 50 Shore. In particular, the material may be a thermoplastic polyurethane elastomer. Preferably said two rollers have a plurality of circumferential grooves in said resilient surfaces, in which case the width of each of the said grooves may be at least equal to the spacing between adjacent grooves.

BRIEF DESCRIPTION OF THE DRAWINGS

Two forms of magnetic-tape recorder in accordance with this invention will now be described, by way of example, with reference to the accompanying drawings, in which:

FIGS. 2a and 2b are, respectively, an isometric view and a side view of a tension roller of the recorder shown in FIG. 1.

DESCRIPTION OF THE PREFERRED EMBODIMENTS

Figure 1:
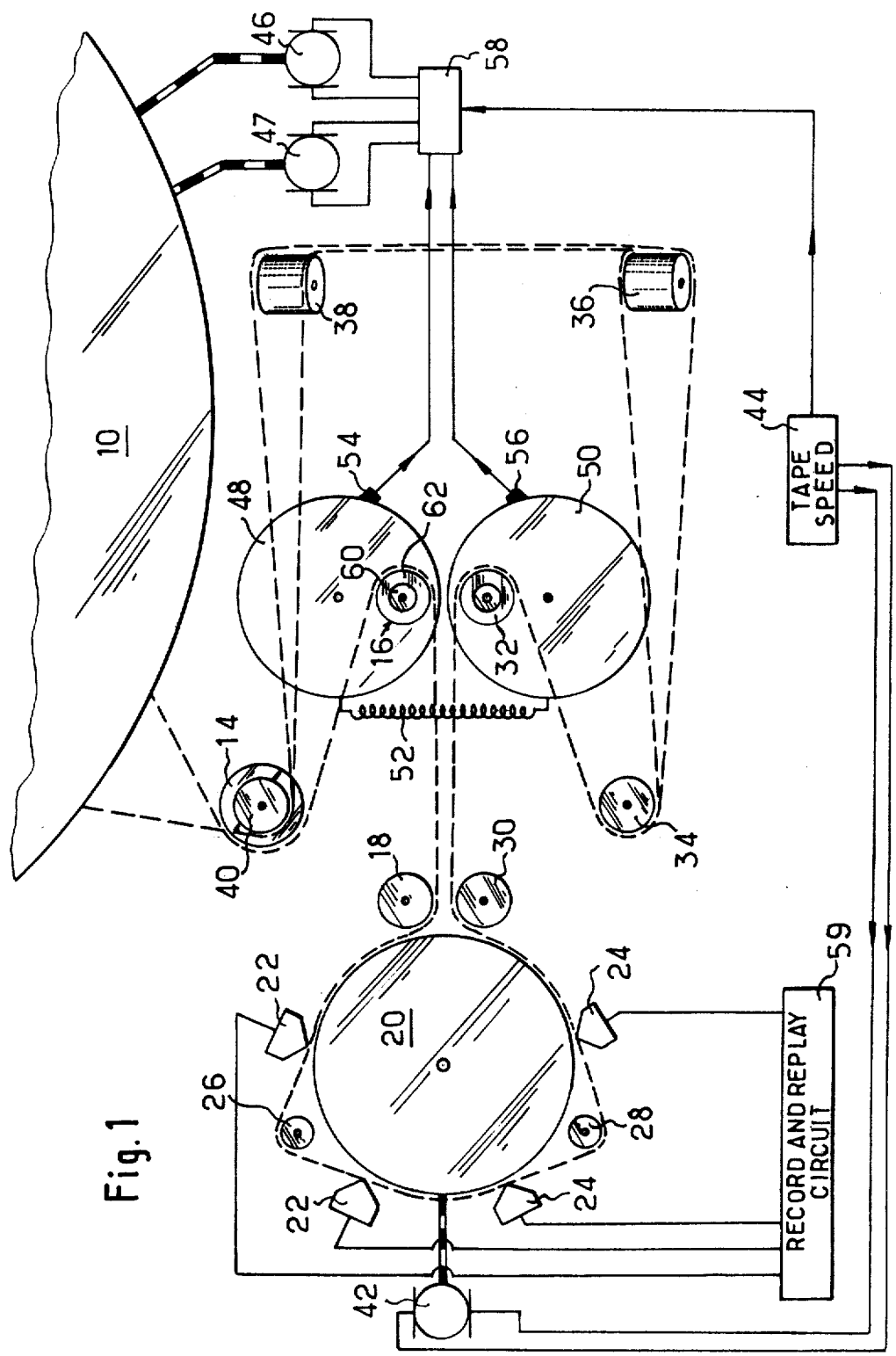
FIG. 1 is a schematic diagram of a first form of recorder, showing the tape transport in particular.

Referring to FIG. 1, there is shown a magnetic-tape recorder in which the supply and take-up spools are stacked on top of one another. The tape path (shown in dashed lines in FIG. 1) therefore starts on the lower, supply spool (hidden under the upper, take-up spool 10 in the view of FIG. 1), from which the tape runs round an upright guide roller 14 to a first tension roller 16. The tape then travels round a guide roller 18 mounted close to a capstan 20, which frictionally engages the tape and carries it at a closely-controlled speed past a pair of record heads 22 and a pair of replay heads 24. A respective lift-off roller 26, 28 is positioned between the record heads 22 and between the replay heads 24 to raise the tape from the surface of the capstan 20, thereby ensuring positive contact between the tape and the tape heads 22, 24.

The tape leaves the capstan 20 at another guide roller 30 mounted close to the capstan 20 and to the roller 18, and passes round a second tension roller 32 to an upright guide roller 34.

The tape path as thus far described lies in the same plane as the supply pool. However, it is necessary to displace the tape path upwards to the plane of the take-up pool 10. Accordingly, the tape passes from the roller 34 to a roller 36 whose axis is tilted, thereby imparting a twist to the tape between these two rollers 34 and 36. The tape path turns through a right angle at the roller 36 towards another roller 38 tilted through the same angles as, but mounted at a higher level than, the roller 36. After turning through another right angle around the roller 38, the tape runs to an upright guide roller 40, receiving a twist in the opposite sense to that imparted between the rollers 34 and 36. The roller 40 is mounted above and on the same axis as the roller 14, and guides the tape on to the take-up spool 10.

A motor 42 drives the capstan 20 at a constant speed under the control of a tape speed circuit 44, and another pair of motors 46, 47 drives the supply and take-up spools at respective speeds which, although to some extent determined by the circuit 44, are primarily governed by signals indicative of the tape tension. To this end, the tension rollers 16 and 32 are mounted towards the periphery of respective discs 48, 50 which are mounted for rotation about their centres. A tension spring 52 is connected between the discs 48 and 50 to urge their adjacent edges (and therefore the rollers 16 and 32) to the right as viewed in FIG. 1. Two pick-offs 54 and 55 supply signals indicative of the angular displacements of the discs 48 and 50 to a control circuit 58, which controls the motors 46 and 47 to turn the supply and take-up spools at speeds such that the angular displacements of the discs 48 and 50 are kept equal. This criterion ensures that the tensions in the portions of tape around the tension rollers 16 and 32 are equal, and thus that the supply and take-up spools are rotating at the correct relative speeds and there is no slipping of the tape around the capstan 20.

The signals to be recorded on, and retrieved from, the tape are supplied to the record heads 22 and received from the replay heads 24 by record and replay circuitry 59. The details of this circuitry 59, and of the circuits 44 and 58, are well known and need not be discussed here.

One of the problems encountered in magnetic-tape recorders is the phenomenon of flutter, in which the speed at which the tape passes the record and replay heads 22, 24 is subject to variations of low amplitude and high frequency. Such variations cause distortion of the signal received from the replay heads 24 relative to the signal supplied to the record heads 22.

In the recorder shown in FIG. 1, flutter is reduced by a novel choice of materials for the tension rollers 16 and 32. Whereas the other rollers 14, 18, 26, 28, 30, 34, 36, 38 and 40 are made in conventional manner from stainless steel, the rollers 16 and 32 have, as shown in detail in FIG. 2a for the roller 16, a core 60 of stainless steel carrying an outer layer or sheath 62 of a resilient material. This sheath 62 has grooves 64 machined in its surface to help prevent a cushion of air forming between the roller and the tape at high tape speeds.

It has been found that providing the tension rollers 16 and 32 with a resilient surface confers a significant reduction in flutter. It is believed that this reduction is due to absorption by the resilient surface of vibration of the tape arising, in particular, from the motors 46 and 47 and transmitted via non-resilient guide rollers such as 14, 34, 36, 38 and 40. Consequently, it is desirable for the minimum number of conventional, non-resilient rollers (such as 18 and 30) to be interposed between the resilient rollers (such as 16 and 32) and the area of the tape heads 22, 24. In this respect, the tension rollers 16 and 32 of the recorder shown in FIG. 1 are conveniently situated to provide optimum absorption of vibration without disturbing the accuracy of tape speed at the heads 22, 24. Furthermore, although the tensioning function of the rollers 16 and 32 is not itself an essential factor in the choice of which rollers should have a resilient surface, it does help to ensure intimate contact between the tape and the vibration-absorbing resilient surfaces of those rollers 16 and 32.

The resilient material of the sheath 62 can be for example a thermoplastic polyurethane elastomer, such as that sold under the trade mark ADIPRENE. Any other material having similar properties of stability under conditions of mechanically- or temperature-induced stress, and having a similar hardness (in the range 40–50 Short) could be used. Furthermore, it is envisaged that materials with a hardness in the range 30 to 100 Shore could also be used, possibly without the central core 60 shown in FIG. 2a.

It is possible that some materials, such as ADIPRENE, having sufficient dimensional stability to be machined to, and to retain, an adequate accuracy, will have a bulk resilience that is too high to provide optimum reduction of flutter. It has been found that this problem can be alleviated by the provision of, and when necessary by appropriate dimensioning of, the grooves 64. Thus, selection of the width w and depth d of these grooves 64 (see FIG. 2b) enables the effective resilience of the surface of the roller 16 to be controllably reduced below the bulk value for the material constituting the sheath 62, without affecting the dimensional accuracy of the roller 16. In particular the width w can usefully be at least equal to, or, as shown in FIG. 2b, greater than the spacing s of adjacent grooves.

Figure 3:
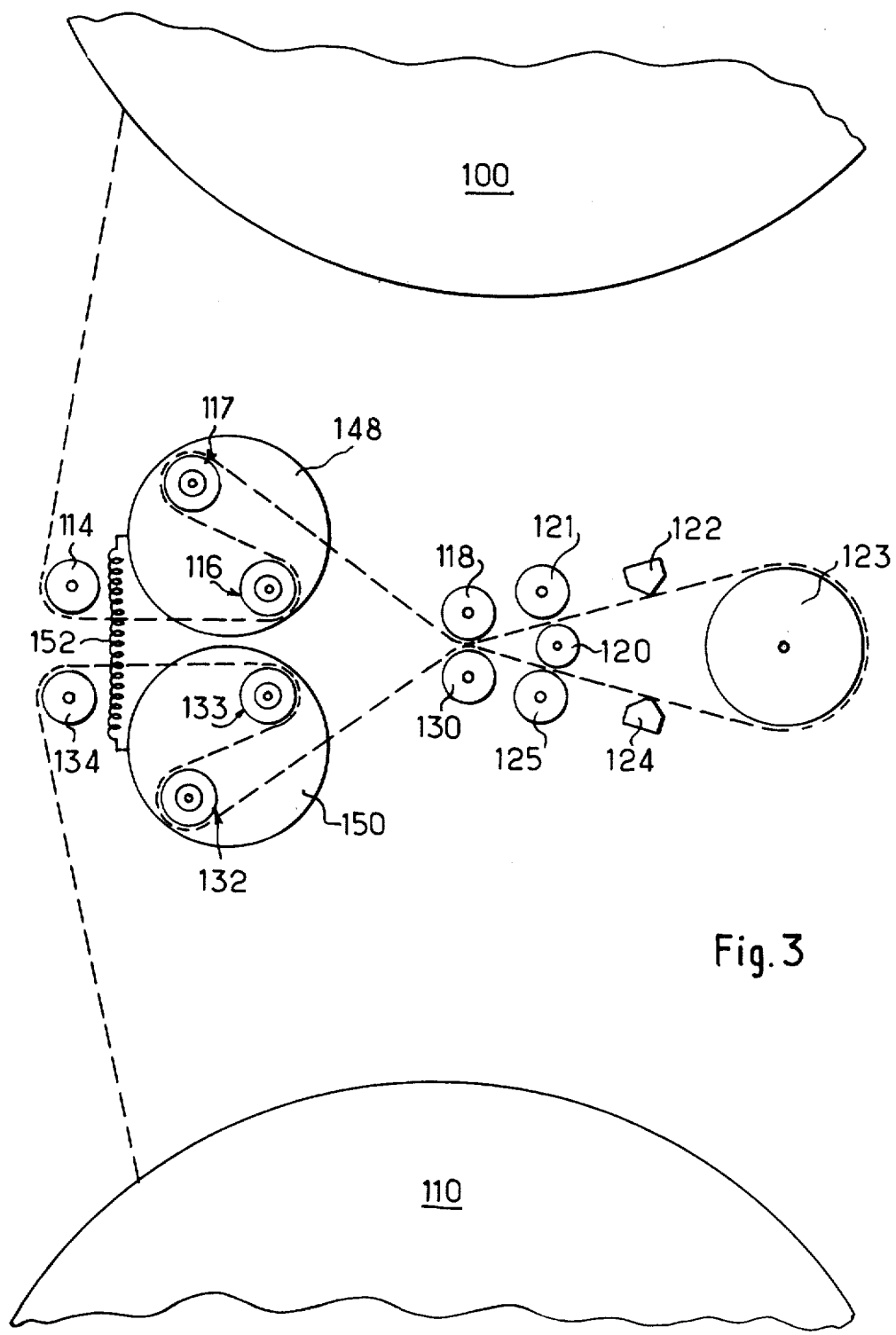
FIG. 3 is a schematic diagram of the tape transport of the second form of recorder.

FIG. 3 shows a second form of tape recorder, in which the entire tape path is in a single plane. Corresponding parts in FIGS. 1 and 3 have corresponding reference numerals, with those in FIG. 3 increased by 100.

Referring to FIG. 3, the tape passes from a supply spool 100 round a guide roller 114 to a tension roller 116. This tension roller 116 is mounted on a rotatable disc 148, and (unlike the recorder shown in FIG. 1) has associated with it a second, similar tension roller 117, the tape being arranged to pass around and between the rollers 116 and 117 along a serpentine path. The tape then travels round a guide roller 118, between a capstan 120 and a pinch roller 121, and past a record head 122 to a guide roller 123, from which it returns via a replay head 124, between the capstan 120 and another pinch roller 125, round a guide roller 130, two more tension rollers 132 and 133, and a guide roller 134 to a take-up spool 110.

The tension rollers 132 and 133 are mounted on a rotatable disc 150, in a similar manner to the tension rollers 116 and 117, and the two discs 148 and 150 are urged to tension the tape by means of a spring 152. The drive motors and control circuits are arranged in the same manner as in the recorder of FIG. 1, and have therefore been omitted from FIG. 3 for the sake of clarity.

In order to reduce flutter, the tension rollers 116, 117, 132 and 133 are provided with a resilient surface in the same way as for the roller 16 shown in FIGS. 1 and 2. Thus, each of these rollers has a steel core 160 surrounded by a layer 162 of a resilient material, such as a polyurethane elastomer, bearing suitably dimensioned grooves. The observations made in relation to the recorder shown in FIG. 1, as regards the choice of which rollers have a resilient surface, also apply to the recorder in FIG. 3. Thus, in either recorder, it is envisaged that rollers other than, or in addition to, the tension rollers could have resilient surfaces.

I claim:

1. A magnetic tape recorder comprising tape supply means and take-up means, means for guiding the tape along a predetermined path between said tape supply and take-up means, at least one tape head adapted for engagement with said tape at a location of said path, and means adjacent said location for driving tape along said path, said guiding means including at least two rollers positioned in said path respectively before and after said tape head, respective movable members carrying the rollers, and servo drive means for controlling the positions of said movable members thereby to absorb substantial variations in tape tensions and maintain tape tension at a constant value, said rollers having resilient surfaces designed to absorb vibration energy of the tape thereby to reduce flutter.

2. A recorder according to claim 1, wherein at least one other respective roller is positioned in the tape path between said tape head and each of said two rollers.

3. A recorder according to claim 1, wherein each of said two rollers comprises a core carrying an outer layer of resilient material.

4. A recorder according to claim 3, wherein said resilient material has a hardness in the range 30 to 100 Shore.

5. A recorder according to claim 4, wherein said resilient material has a hardness of between 40 and 50 Shore.

6. A recorder according to claim 5, wherein said resilient material is a thermoplastic polyurethane elastomer.

7. A recorder according to claim 1, wherein there are two pairs of rollers which have resilient surfaces, the pairs being positioned respectively before and after the tape head and being arranged for the tape to follow a serpentine path around each pair.

8. A recorder according to claim 1, wherein said two rollers have a plurality of circumferential grooves in said resilient surfaces.

9. A recorder according to claim 8, wherein the width of each of said grooves is at least equal to the spacing between adjacent grooves.

* * * * *